(12) United States Patent
Hoff et al.

(10) Patent No.: US 9,046,160 B2
(45) Date of Patent: Jun. 2, 2015

(54) CONTROL SYSTEM FOR DIFFERENTIAL OF MACHINE

(71) Applicant: Caterpillar Inc., Peoria, IL (US)

(72) Inventors: Brian D. Hoff, East Peoria, IL (US); Mark E. Rettig, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 13/855,842

(22) Filed: Apr. 3, 2013

(65) Prior Publication Data

US 2014/0303862 A1 Oct. 9, 2014

(51) Int. Cl.
| | |
|---|---|
| F16D 48/02 | (2006.01) |
| F16H 48/00 | (2012.01) |
| F16D 25/12 | (2006.01) |
| B60W 10/12 | (2012.01) |
| F16H 48/22 | (2006.01) |
| F16H 48/32 | (2012.01) |
| F16H 48/20 | (2012.01) |

(52) U.S. Cl.
CPC ............... F16H 48/00 (2013.01); F16D 25/12 (2013.01); B60W 10/12 (2013.01); F16H 48/22 (2013.01); F16H 48/32 (2013.01); *F16H 2048/205* (2013.01)

(58) Field of Classification Search
CPC ....................................................... F16D 25/14
USPC ............................................... 701/67; 475/86
See application file for complete search history.

(56) References Cited

U.S. PATENT DOCUMENTS

| | | |
|---|---|---|
| 5,065,835 A | 11/1991 | Richter et al. |
| 6,059,680 A | 5/2000 | Yoshioka |
| 6,174,255 B1 | 1/2001 | Porter et al. |
| 7,641,014 B2 | 1/2010 | Hu |
| 2005/0209761 A1* | 9/2005 | Elie et al. .................... 701/67 |
| 2007/0250236 A1 | 10/2007 | Newberry et al. |
| 2009/0032360 A1* | 2/2009 | Asano ...................... 192/87.13 |
| 2009/0055063 A1* | 2/2009 | Nakamura et al. ............. 701/60 |
| 2010/0121546 A1* | 5/2010 | Ikushima et al. ............... 701/67 |
| 2011/0082634 A1 | 4/2011 | Povirk et al. |
| 2011/0269595 A1 | 11/2011 | Marsh et al. |
| 2014/0303864 A1* | 10/2014 | Karlsson et al. ............... 701/69 |

FOREIGN PATENT DOCUMENTS

| | | |
|---|---|---|
| EP | 1468860 | 9/2007 |
| WO | 2012161648 | 11/2012 |

* cited by examiner

*Primary Examiner* — Edwin A Young
(74) *Attorney, Agent, or Firm* — Miller, Matthias & Hull LLP

(57) ABSTRACT

A method for controlling an operational state of a differential of a machine is disclosed. The method includes determining a transmission output speed, a transmission output torque and a degree of steering of the machine. The method further includes actuating a locking mechanism associated with the differential based on the transmission output speed, the transmission output torque, and the degree of steering.

20 Claims, 4 Drawing Sheets

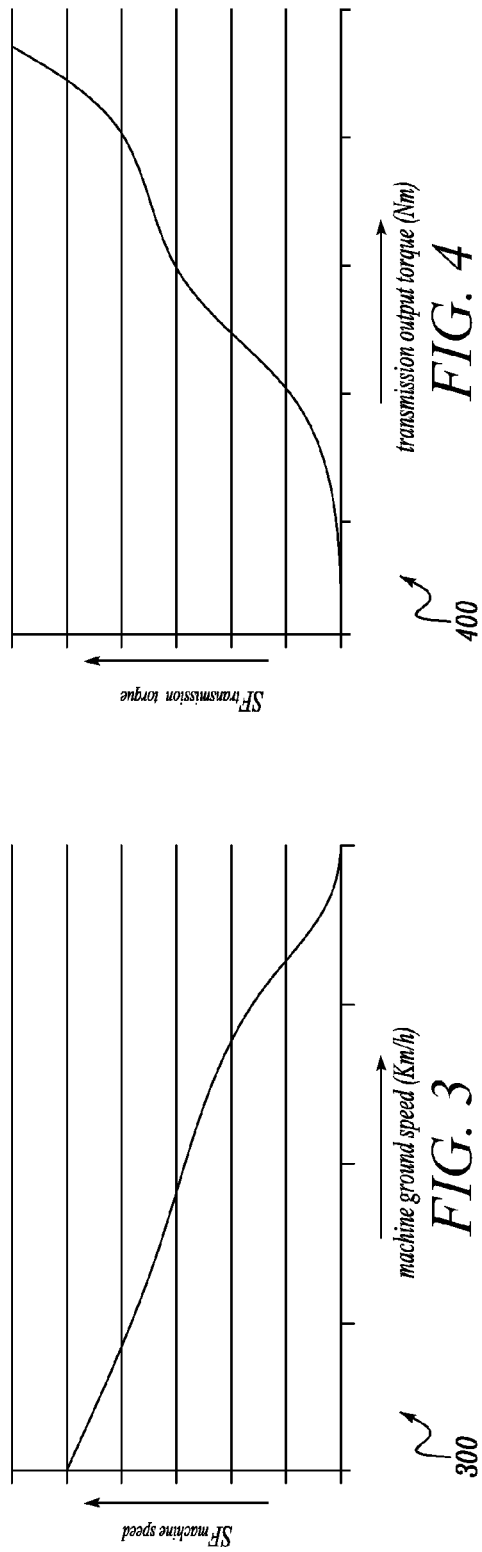
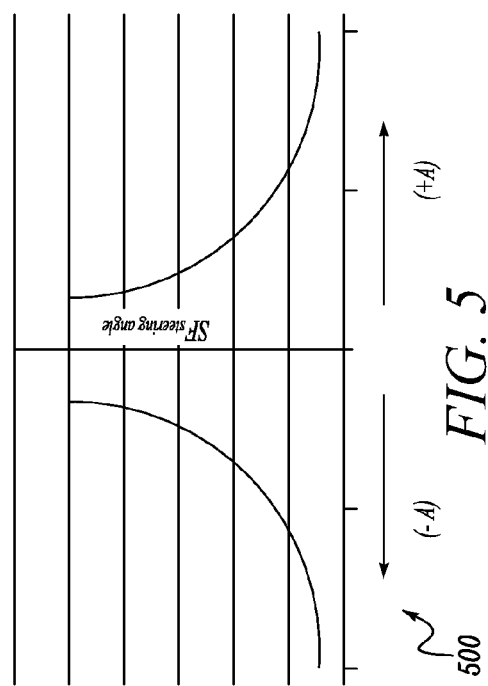
FIG. 3
FIG. 4
FIG. 5

CONTROL SYSTEM FOR DIFFERENTIAL OF MACHINE

TECHNICAL FIELD

The present disclosure relates to a system and method for controlling an operational state of a differential of a machine, and more particularly to system and method for controlling the operational state of the differential.

BACKGROUND

Conventional system and methods for controlling the operational state of the differential of a machine rely on an input from at least from one or more radars, transmission torque/speed output sensors, and one or more wheel speed sensors to determine a wheel slip condition. However, if the machine is running at a slow speed the wheel speed sensors output may not provide good resolution of the wheel speed and may not be able to accurately detect the wheel slip condition. Further, conventional control systems and methods for controlling the operational state of the differential may require complex algorithms, and may be difficult to operate.

U.S. Published Application No. 20110269595 relates to a drive train having a locking differential and a control unit for controlling operation of the locking differential. The control unit is responsive to selected vehicle characteristics to sua sponte activate or inactivate a locking mechanism of the locking differential to cause the locking differential to operate in a locked manner or an unlocked manner, respectively. A method for operating a locking differential is also provided. The method includes: utilizing only preselected vehicle criteria indicative of the operational state of the vehicle to identify a situation in which a locking mechanism associated with the locking differential is to be energized; and responsively energizing the locking mechanism.

SUMMARY OF THE DISCLOSURE

In one aspect, the present disclosure provides a method for controlling an operational state of a differential of a machine. The method includes determining a transmission output speed, a transmission output torque and a degree of steering of the machine. The method further includes modulating a hydraulic pressure on a clutch pack of a locking mechanism associated with the differential based on the transmission output speed, the transmission output torque, and the degree of steering.

In another aspect, the present disclosure provides a control system for controlling an operational state of a differential of a machine. The control system is configured to determine the transmission output speed the transmission output torque, and the degree of steering of the machine. The control unit is further configured to modulate a hydraulic pressure on a clutch pack of a locking mechanism associated with the differential based on the transmission output speed, the transmission output torque, and the degree of steering.

Other features and aspects of this disclosure will be apparent from the following description and the accompanying drawings.

BRIEF DESCRIPTION OF THE DRAWINGS

FIGS. 3-5 are graphical depiction of scale factor curves, according to an aspect of the present disclosure.

DETAILED DESCRIPTION

Figure 1:
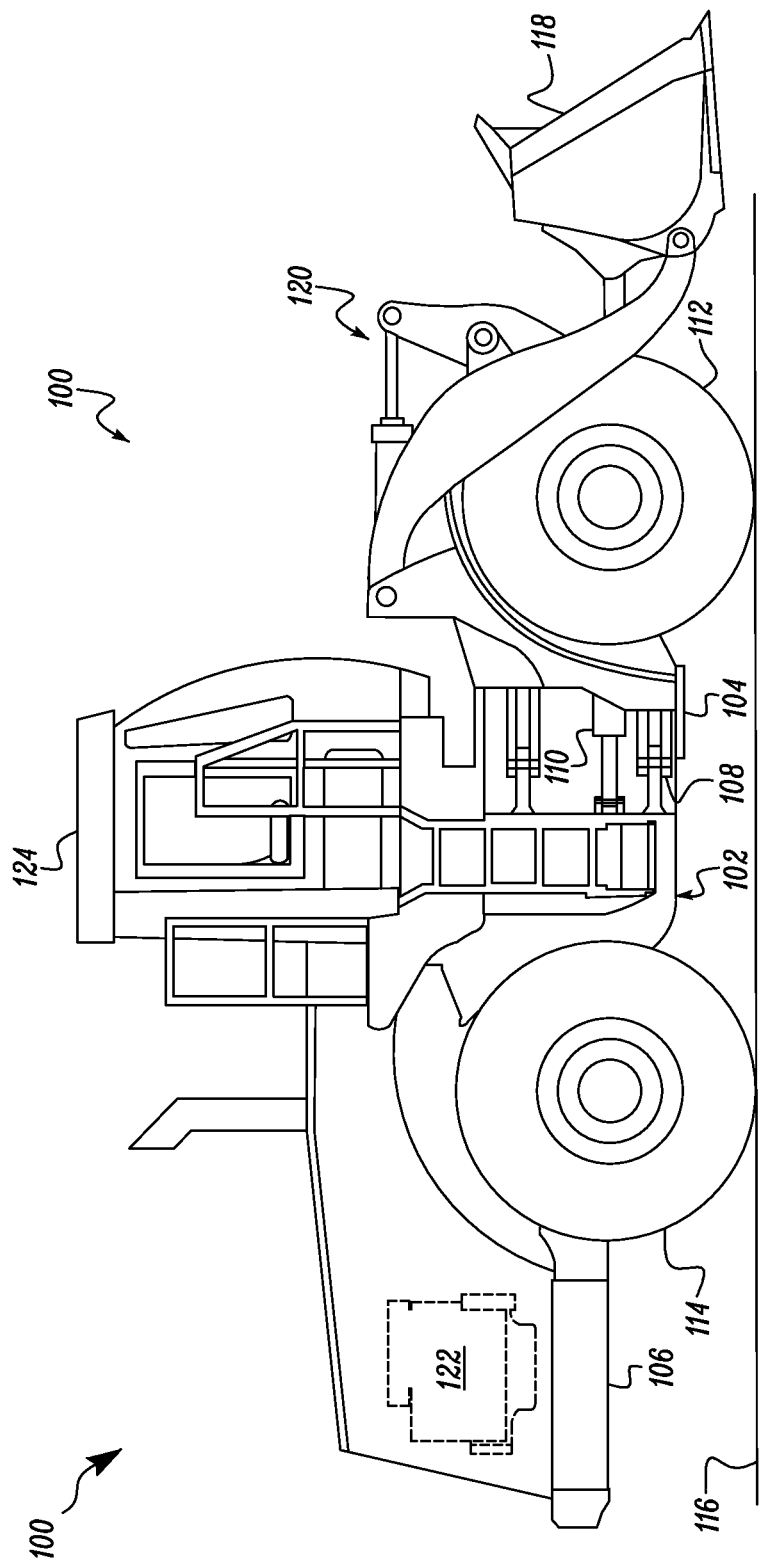
FIG. 1 illustrates a side view of an exemplary machine.

The present disclosure relates to a control system to control the operational state of a differential in a machine. FIG. 1 illustrates a side view of an exemplary machine 100. The machine 100 may embody a wheel loader used to excavate and load materials such as sand, gravel or ore onto other machinery such as a material conveyor or a haul truck. In an exemplary embodiment, as illustrated in FIG. 1, the machine 100 may include a frame 102. The frame 102 may include a front section 104 and a rear section 106. In an embodiment, the front section 104 may be connected with the rear section 106 by an articulated joint 108 such that, steering of the machine 100 may be provided by one or more articulation actuators 110 (only one is shown) mounted between the front section 104 and the rear section 106 on opposite sides of the machine 100. However, in other embodiments, the machine 100 may include other steering mechanisms commonly known in the art such as Ackermann steering, and the like.

The machine 100 further includes ground engaging drive members, such as front wheels 112 mounted on the front section 104 and rear wheels 114 mounted on the rear section 106. The front and the rear wheels 112 and 114 supports the machine 100 on ground 116. The front section 104 may include an implement 118, such as a bucket, that is coupled to the front section 104 via a linkage assembly 120. The rear section 106 may include a power source, such as an engine 122 to power the set of the wheels 112, 114 to propel the machine 100, and a hydraulic pump (not shown) to steer the machine 100 and operate the implement 118. The machine 100 may further include an operator station 124 which contains one or more control means to control the operations of the machine 100.

Figure 2:
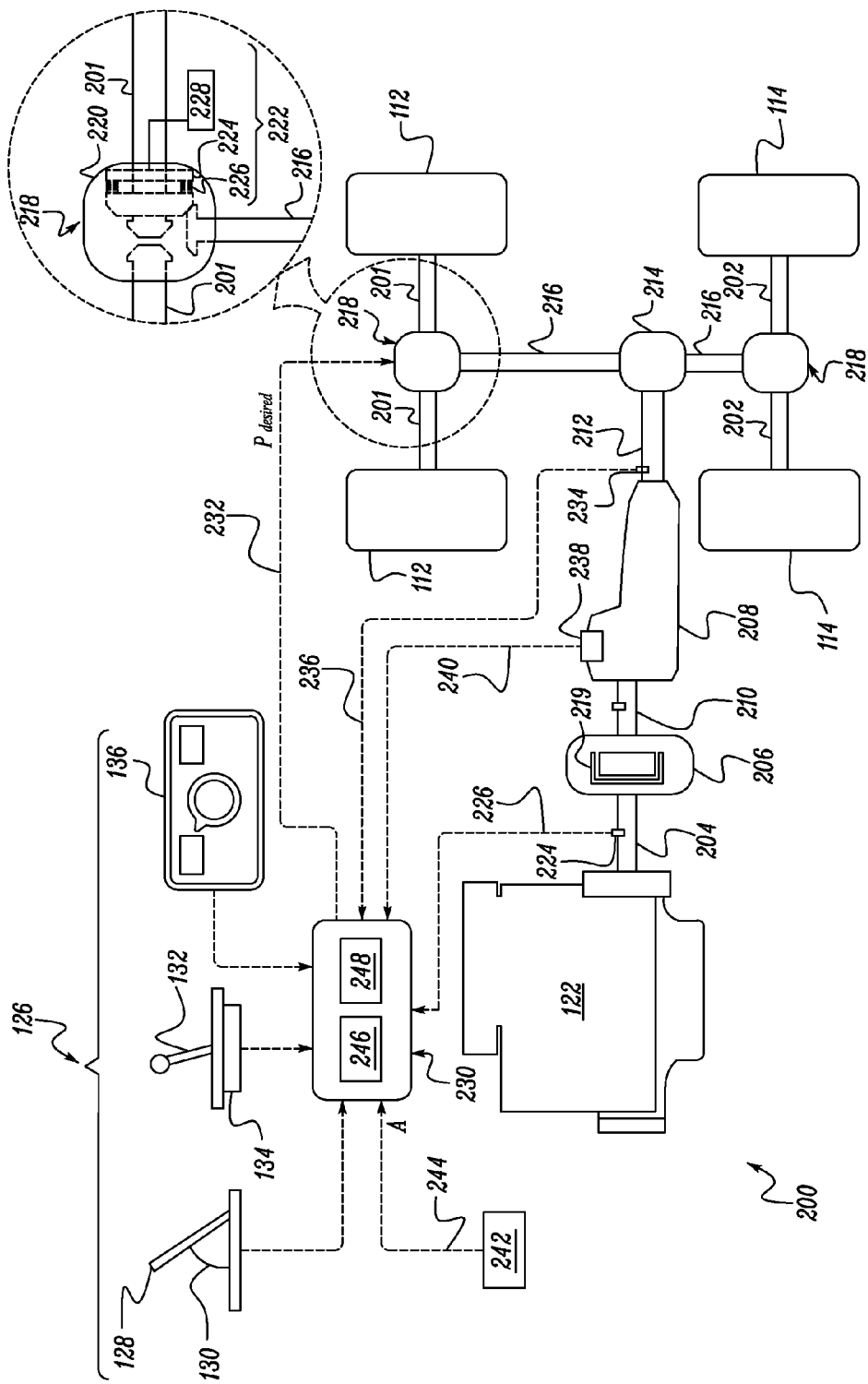
FIG. 2 illustrates a schematic of an exemplary powertrain of the machine.

FIG. 2 illustrates a schematic of an exemplary powertrain 200 of the machine 100. In reference to FIGS. 1 and 2, the powertrain 200 may include respective axle shafts 201, 202 connected to the set of wheels 112, 114. An engine output shaft 204 is connected to a torque converter 206, and the torque converter 206 is further connected to a transmission 208 via a transmission input shaft 210. Further, a transmission output shaft 212 is connected to a transfer case 214 that powers two drive shafts 216, one for each of the axle 201, 202. Each of the drive shaft 216 transmits power to the wheels 112, 114 via respective differentials 218 such that rotational power produced at the engine output shaft 204 is transmitted to the wheels 112, 114. The torque converter 206 may be a hydro-mechanical device configured to couple the engine 122 with the transmission 208. The torque converter 206 may include a lock-up clutch 219 for selectively coupling the engine output shaft 204 to the transmission input shaft 210. The transmission 208 may embody a multi-speed, bidirectional, mechanical transmission having a neutral gear ratio, a plurality of forward gear ratios, and a plurality of reverse gear ratios. In an embodiment, the forward gear ratios may include a first gear ratio and a second gear ratio. Further, the transfer case 214 may include a reduction gear set. The transfer case 214 is configured to multiply and distribute a transmission output torque between the drive shafts 216.

The differentials 218 associated with the front and the rear wheels 112, 114 may be similar in construction and operation, hence only one of the differentials 218 is discussed in detail herein. The differential 218 may be housed in a differential housing 220 and the axle shafts 201 may be coupled to opposite sides of the differential 218. The differential 218 may be a locking type differential which can operate in different operational states such as an open state, a locked state, and a partially locked state. Those of skill in the art will appreciate that operation of the differential 218 in the open state permits an unequal speed distribution to each of the axle shaft 201, while operation of the differential 218 in the locked state or partially locked state does not permit the unequal speed distribution to each of the axle shaft 201.

According to an embodiment of the present disclosure, the differential 218 may include a locking mechanism 222 associated with the differential 218. The locking mechanism 222 may be a hydraulic locking mechanism including a clutch actuator 224 and a clutch pack 226. In an embodiment, the clutch actuator 224 may be a hydraulic piston configured to engage or disengage the clutch pack 226 in response to a hydraulic pressure. Further, the locking mechanism 222 may include a control valve 228. The control valve 228 is configured to selectively allow supply and/or discharge of fluid into the clutch actuator 224 to modulate the hydraulic pressure on the clutch pack 226 and control the operational state of the differential 218 by engaging or disengaging the clutch pack 226.

Moreover, the machine 100 may include one or more operator interface devices 126 located in the operator station 124. The operator interface devices 126 may include a throttle pedal 128 having a throttle position sensor (TPS) 130, and a gear selector lever 132 having a lever encoder 134. The TPS 130 and the lever encoder 134 are configured to provide a desired machine speed signal indicative of an operator desired machine speed and a current gear ratio setting of the transmission 208 that is commanded by the operator during the operation of the machine 100. In an aspect of the present disclosure, the operator interface devices 126 may also include a selector interface 136 configured to select a manual mode or an automatic mode of operation of the differential 218. The selector interface 136 may embody a switch, a dial, a lever, a touch based interface, or a voice based interface or the like.

As shown in FIG. 2, a control system 230 is provided to control the operational state of the differential 218. The control system 230 may be an electronic control system that may include a micro-processor operably associated with other electronic components such as data storage devices and various communication channels. The control system 230 may communicate with the control valve 228, one or more sensors which is/are configured to sense a parameter indicative of an operational state of the powertrain 200, and to various other control systems incorporated into the machine 100. In an embodiment, the control system 230 may be operatively connected to the control valve 228 via a control valve communication line 232, a transmission output shaft speed sensor 234 via an transmission output speed communication channel 236, a transmission output torque sensor 238 via a transmission output torque communication channel 240, and a steering angle sensor 242 via a steering angle communication channel 244. The control system 230 may regulate the operation of the differential 218 in response to signals indicative of the operational state of the powertrain 200 as well as the signals received from the operator interface devices 126, such as the TPS 130, the lever encoder 134, and the selector interface 136. In an alternative embodiment, the powertrain 200 may also include a transmission control unit to provide information to the control system 230 indicative of the current gear ratio setting, the transmission output speed, and the transmission output torque, and the like. It will be apparent to a person having ordinary skill in the art that the control system 230 may be operatively implemented within an engine control unit (ECU), used to control the engine 122.

The transmission output shaft speed sensor 234 may be coupled to the transmission output shaft 212 and is configured to generate a transmission output shaft speed signal indicative of a transmission output speed. In an embodiment, the control system 230 is configured to determine a machine speed as a function the transmission output speed received from the transmission output shaft speed sensor 234 and the TPS 130. In one embodiment, the transmission output torque sensor 238 may include a strain gauge coupled to the transmission output shaft 212 and configured to generate a transmission output shaft torque signal indicative of a transmission output torque. However, in an alternative embodiment, the lever encoder 134 may be used to determine the transmission output torque based on the current gear settings. It will be apparent to one skilled in the art that the transmission output torque may also be calculated based on other parameters indicative of a hydrostatic loop pressure, and speed from within the transmission.

The steering angle sensor is configured to generate a steering angle signal indicative of a steering angle A. In an embodiment, the steering angle sensor 242 may include position sensor for representing the extended or retracted position of the articulation actuators 110 (see FIG. 1). Alternatively, a rotary sensor may be positioned at the articulation joint 108 and be configured to generate a signal indicative of the steering angle A. It will be apparent to a person having ordinary skill in the art that the steering angle A of the machine 100 is indicative of a degree of steering of the front section 104 with respect to the rear section 106 of the machine 100.

In an embodiment, the control system 230 is configured to transmit a differential clutch command signal to the control valve 228 via the control valve communication line 232. The differential clutch command signal may selectively modulate the hydraulic pressure on the clutch pack 226 to control the operational state of the differential 218. In an embodiment, the differential clutch command signal may be indicative of a desired hydraulic pressure $P_{desired}$ on the clutch pack 226 based on the transmission output speed, the transmission output torque, and the steering angle A of the machine 100 received and processed by the control system 230 using the transmission output shaft speed sensor 234, the transmission output torque sensor 238, and the steering angle sensor 242, respectively. In an embodiment, the desired hydraulic pressure $P_{desired}$ on the clutch pack 226 may be a function of a maximum hydraulic pressure $P_{max}$ for engaging the clutch pack 226 to operate the differential 218 in the locked state.

The control system may include a system memory 246 for example, but not limited to, a Random Access Memory (RAM), a Read Only Memory (ROM), flash memory, a data structure, and the like. The system memory 246 may store a computer executable code to compute the desired hydraulic pressure $P_{desired}$ as a function of the transmission output speed, the transmission output torque, the steering angle A, and the maximum hydraulic pressure $P_{max}$ for engaging or disengaging the clutch pack 226. Moreover, the system memory 246 may store the one or more real time inputs and/or signals received from various sensors 234, 238, and 242. The system memory 246 may be operable on a processing unit 248 to output the differential clutch command signal may selectively modulate the hydraulic pressure on the clutch pack 226 to control the operational state of the differential 218.

According to an embodiment of the present disclosure, the system memory 246 associated with the control system 230 may store various scale factor curves 300, 400, and 500, as graphically depicted in FIGS. 3-5, to store and determine and/or dynamically update a machine speed scale factor $SF_{machine\ speed}$, a transmission output torque scale factor $SF_{transmission\ torque}$, and a steering angle scale factor $SF_{steering\ angle}$, based on the transmission output speed, the transmission output torque, and the steering angle A, respectively. Moreover, in various other embodiments, the control system 230 may include modulation curves, data tables, and/or module maps to dynamically determine and store the the machine speed scale factor $SF_{machine\ speed}$, the transmission output torque scale factor $SF_{transmission\ torque}$, the steering angle scale factor $SF_{steering\ angle}$.

According to an embodiment of the present disclosure, the desired hydraulic pressure $P_{desired}$ may be determined as multiplication of the machine speed scale factor $SF_{machine\ speed}$, the a transmission output torque scale factor $SF_{transmission\ torque}$, the steering angle scale factor $SF_{steering\ angle}$, and the maximum hydraulic pressure $P_{max}$. Thus, a mathematical equation to determine the desired hydraulic pressure $P_{desired}$ is defined by the following Equation #1:

$$P_{desired} = P_{max} \times SF_{machine\ speed} \times SF_{transmission\ torque} \times SF_{steering\ angle} \qquad \text{Equation \#1}$$

The scale factor curves 300, 400, and 500 are graphical representations to determine the machine speed scale factor $SF_{machine\ speed}$, the transmission output torque scale factor $SF_{transmission\ torque}$, and the steering angle scale factor $SF_{steering\ angle}$, respectively. As illustrated in FIG. 3, the machine speed scale factor $SF_{machine\ speed}$ is in a substantially inverse proportionality to the machine speed and may be equal to 0 above a pre-determined machine speed. In an exemplary embodiment, the pre-determined machine speed is equal to or less than 4.0 Km/h.

As illustrated in FIG. 4, the transmission output torque scale factor $SF_{transmission\ torque}$, is indicative of adjusted traction to avoid slip during a high transmission torque output. As shown in FIG. 4, the transmission output torque scale factor increases with an increase in the transmission output torque, thus (referring to Equation 1), higher values of transmission output torque scale factor may increase the desired hydraulic pressure and avoid slip by selectively locking the differential to permit the unequal speed distribution to each of the axle shaft 201, 202.

FIG. 5 illustrates a right steering angle (+A) which is a mirror image of a left steering angle (−A). The steering angle scale factor $SF_{steering\ angle}$ may decrease while the machine 100 negotiate a turn in a right or left direction, to maintain the differential 218 in the partially locked or open states allowing the wheels 112, 114 to permits an unequal speed distribution to each of the axle shaft 201, 202. Further, in an exemplary embodiment, the maximum hydraulic pressure $P_{max}$ is substantially equal to about 3100 kPa.

Industrial Applicability

The industrial applicability of the systems and methods for controlling operational state of a differential in a machine described herein will be readily appreciated from the foregoing discussion. Although the machine 100 shown as the wheel loader, any articulate machine that performs at least one operation associated with, for example, mining, construction, and other industrial applications may embody the disclosed systems and methods. The machine 100 may also be associated with non-industrial uses and environments, for example, but not limited to, landfill compactors, material loaders, excavators, articulated trucks, compactors, motor graders, road reclaimers, skidders, wheel dozers, wheel tractor-scrapers, backhoe loaders, and the like.

Conventional system and methods control the operational state of the differential after detection of the wheel slip condition. Moreover, the wheel speed sensors used to detect the wheel slip condition in combination with machine position locating ground radar, transmission torque/speed output sensors may not provides good resolution at low machine speed. Thus, the operational state of the differential may not be controlled in a desired manner According to an embodiment of the present disclosure, the control system 230 is proactive system which is configured to control the operational state of the differential 218 well before the wheel slip condition occur. As described above, the control system 230 is configured to control the operational state of the differential 218 based on the transmission output speed, the transmission output torque, and the degree of steering of the machine. The control strategy for controlling the operational state of the differential 218 according to the preset disclosure provides increased comfort to the operator, and decreases wear on the clutch pack 226 due to the smooth engagement and disengagement of the clutch pack 226. Further, service life of a drivetrain may also be improved because smooth engagement and disengagement of the clutch pack reduces sudden increase and/or decrease in the transmission output torque. Moreover, wear of the wheels 112, 114 also reduces due to the absence of the wheel slip condition. Thus, an overall increase in the service life of the differential 218 and the wheels 112, 114.

Figure 6:
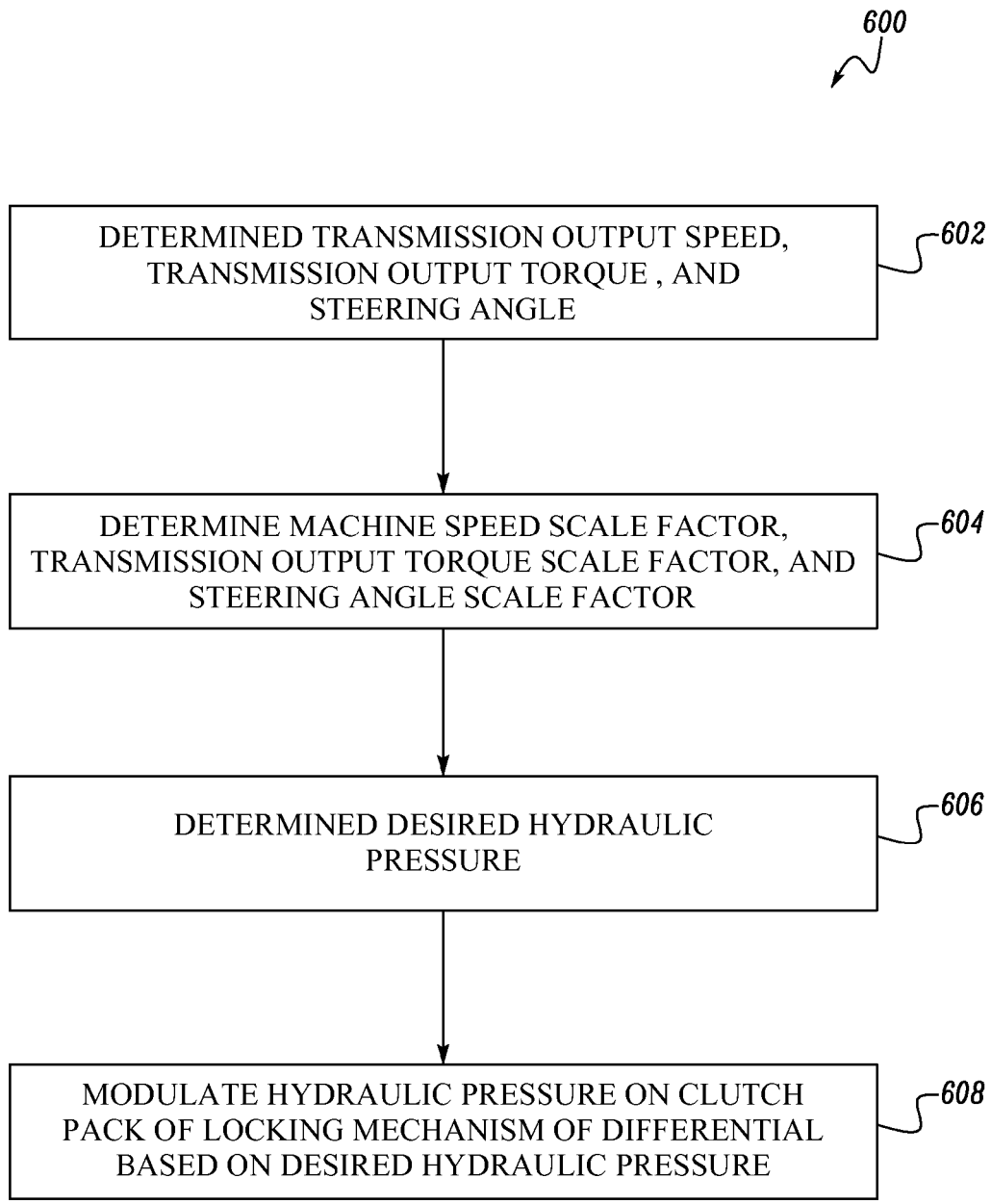
FIG. 6 a flowchart for an exemplary method for controlling an operational state of a differential, according to an embodiment of the present disclosure.

FIG. 6 is a flowchart for an exemplary method 600 for controlling the operational state of the differential 218, according to an embodiment of the present disclosure. At step 602, the control system 230 may determine the transmission output speed using the transmission output shaft speed sensor 238, transmission output torque using the transmission output torque sensor 234, and the steering angle using the steering angle sensor 242. Further, the control system 230 may determine the machine speed scale factor $SF_{machine\ speed}$, the transmission output torque scale factor $SF_{transmission\ torque}$, and the steering angle scale factor $SF_{steering\ angle}$ based on the scale factor curves 300, 400, and 500, at step 604. Following this, at step 606, the control system 230 may determine the desired hydraulic pressure $P_{desired}$ to be applied on the clutch pack 226 based on the machine speed scale factor $SF_{machine\ speed}$, the transmission output torque scale factor $SF_{transmission\ torque}$, steering angle scale factor $SF_{steering\ angle}$, and the maximum hydraulic pressure $P_{max}$ for engaging the locking mechanism to operate the differential in a locked state. As described above, the system memory 246 associated with the control system 230 may dynamically update the machine speed scale factor $SF_{machine\ speed}$, the transmission output torque scale factor $SF_{transmission\ torque}$, and the steering angle scale factor $SF_{steering\ angle}$ to modulate the hydraulic pressure on the clutch pack 226 based on the desired hydraulic pressure $P_{desired}$ to control the operational state of the differential 218 at step 608 using the control valve 228 based on the operational state of the powertrain 200.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for controlling an operational state of a differential of a machine, the method comprising:
   determining a transmission output speed;
   determining a transmission output torque;
   determining a degree of steering of the machine; and
   modulating a hydraulic pressure on a clutch pack of a locking mechanism associated with the differential based on a respective scale factor that provides a scalar adjustment to a maximum clutch pack hydraulic pressure associated with at least one of the transmission output speed, the transmission output torque, and the degree of steering.

2. The method of claim 1 further comprising:
   determining a machine speed scale factor based on the transmission output speed;
   determining a transmission output torque scale factor based on the transmission output torque; and
   determining a steering angle scale factor based on the degree of steering of the machine.

3. The method of claim 2 further comprising determining a desired hydraulic pressure to be applied on the clutch pack based on at least one of the machine speed scale factor, the transmission output torque scale factor, steering angle scale factor, and a maximum hydraulic pressure.

4. The method of claim 3 further including generating a differential clutch command signal based on the determined desired hydraulic pressure.

5. The method of claim 4 further comprising modulating the hydraulic pressure on the clutch pack based on the differential clutch command signal.

6. The method of claim 1, wherein modulating the hydraulic pressure on the clutch pack comprising one of engaging and disengaging the clutch pack to control the operational state of the differential.

7. The method of claim 1 further comprising controlling the operational state of the differential below a threshold machine speed.

8. A control system for controlling an operational state of a differential of a machine, the control system configured to:
   determine a transmission output speed;
   determine a transmission output torque;
   determine a degree of steering of the machine; and
   modulate a hydraulic pressure on a clutch pack of a locking mechanism associated with the differential based on a product of a maximum hydraulic pressure and a scale factor corresponding to at least one of the transmission output speed, the transmission output torque, and the degree of steering.

9. The control system of claim 8 is configured to communicate with a transmission output shaft speed sensor to determine the transmission output speed, and a machine speed scale factor.

10. The control system of claim 8 is configured to communicate with a transmission output torque sensor to determine the transmission output torque, and a transmission output torque scale factor.

11. The control system of claim 8 is configured to communicate with a steering angle sensor to determine the degree of steering of the machine, and a steering angle scale factor.

12. The control system of claim 8 further configured to determine a desired hydraulic pressure on the clutch pack of the locking mechanism based on a machine speed scale factor, a transmission output torque scale factor, a steering angle scale factor, and a maximum hydraulic pressure.

13. The control system of claim 12 further configured to communicate with a control valve to apply the desired hydraulic pressure on the clutch pack of the locking mechanism based on a product of a maximum hydraulic pressure and at least one of the machine speed scale factor, a transmission output torque scale factor, and the steering angle scale factor.

14. A machine comprising:
   a front section connected with a rear section by an articulated joint;
   a ground engaging drive member;
   a powertrain including:
   an engine;
   a transmission; and
   a differential to transmit rotational power to the ground engaging drive member, the differential comprising a locking mechanism; and a control system for controlling an operational state of the differential, the control system configured to:
   determine a transmission output speed;
   determine a transmission output torque;
   determine a degree of steering of the machine; and
   modulate a hydraulic pressure on a clutch pack of a locking mechanism associated with the differential based on a respective scale factor that provides a scalar adjustment to a maximum clutch pack hydraulic pressure associated with at least one of the transmission output speed, the transmission output torque, and the degree of steering.

15. The machine of claim 14, wherein the locking mechanism comprising:
   the clutch pack;
   a clutch actuator configured to modulate the hydraulic pressure on the clutch pack; and
   a control valve configured to selectively supply and discharge fluid into the clutch actuator to modulate the hydraulic pressure on the clutch pack.

16. The machine of claim 15, wherein the control system is configured to communicate with a transmission output shaft speed sensor to determine the transmission output speed, and a machine speed scale factor.

17. The machine of claim 16, wherein the control system is configured to communicate with a transmission output torque sensor to determine the transmission output torque, and a transmission output torque scale factor.

18. The machine of claim 17, wherein the control system is configured to communicate with a steering angle sensor to determine the degree of steering of the machine, and a steering angle scale factor.

19. The machine of claim 18, wherein the control system is further configured to determine a desired hydraulic pressure on the clutch pack of the locking mechanism based on the machine speed scale factor, the transmission output torque scale factor, the steering angle scale factor, and a maximum hydraulic pressure.

20. The machine of claim 19, wherein the control system is configured to communicate with the control valve to apply the desired hydraulic pressure on the clutch pack of the locking mechanism.

* * * * *